(12) United States Patent
Hermey

(10) Patent No.: US 10,088,097 B2
(45) Date of Patent: Oct. 2, 2018

(54) RETAINER FOR LATERALLY FASTENING A GUIDE GROOVE FOR ENERGY SUPPLY CHAINS AND RETAINING SYSTEM HAVING SAID RETAINER

(75) Inventor: Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 281 days.

(21) Appl. No.: 14/115,736

(22) PCT Filed: May 3, 2012

(86) PCT No.: PCT/EP2012/058075
§ 371 (c)(1),
(2), (4) Date: Nov. 5, 2013

(87) PCT Pub. No.: WO2012/150282
PCT Pub. Date: Nov. 8, 2012

(65) Prior Publication Data
US 2014/0061415 A1  Mar. 6, 2014

(30) Foreign Application Priority Data
May 5, 2011 (DE) .................... 20 2011 100 313 U

(51) Int. Cl.
*F16M 13/02* (2006.01)
*H02G 3/00* (2006.01)
*H02G 3/04* (2006.01)

(52) U.S. Cl.
CPC .......... *F16M 13/02* (2013.01); *H02G 3/0431* (2013.01); *H02G 3/263* (2013.01)

(58) Field of Classification Search
CPC ......... H02G 3/0431; H02G 3/263; F16L 3/24; F16L 3/26

(Continued)

(56) References Cited

U.S. PATENT DOCUMENTS 3,069,019 A * 12/1962 Schuster ............... A47F 5/0025
211/73
3,683,312 A * 8/1972 Routh .................... H01R 25/14
248/343

(Continued)

FOREIGN PATENT DOCUMENTS

DE          202274 C        10/1908
DE       10253267 A1        5/2004

(Continued)

OTHER PUBLICATIONS

PCT International Search Report dated May 10, 2013, received in corresponding PCT Application No. PCT/EP12/58075, 2 pgs.

(Continued)

*Primary Examiner* — Muhammad Ijaz
(74) *Attorney, Agent, or Firm* — Grossman, Tucker, Perreault & Pfleger, PLLC

(57) ABSTRACT

The invention relates to a retainer for laterally fastening a guide groove for energy supply chains to a structure. The retainer has a support for a bottom area of the guide groove and a position fixer for the guide groove and extends with a vertical section to the side of an intended accommodating space for the guide groove, in which first fastening elements for fastening the retainer at the height of the vertical section laterally to the structure are provided. The retainer has additional fastening elements, which are arranged at a distance from the support in the vertical direction for support and which are designed to engage on the guide groove in a form- and/or force-closed manner. The invention further relates to a retaining system having the retainer.

33 Claims, 9 Drawing Sheets

Figure 3:
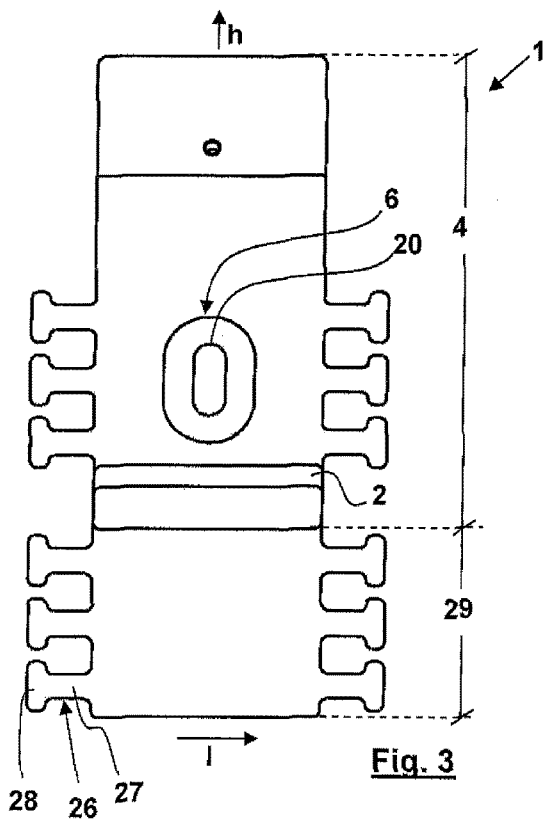

(58) Field of Classification Search
USPC ............ 248/222.51, 222.52, 223.41, 231.91,
248/298.1, 309.1, 311.2, 312.1, 297.31,
248/274.1; 174/101, 504, 68.3; 310/214,
310/215
See application file for complete search history.

(56) References Cited

U.S. PATENT DOCUMENTS

| | | | | | |
|---|---|---|---|---|---|
| 3,821,688 | A * | 6/1974 | Larsile | ................. | H01R 25/165 |
| | | | | | 439/209 |
| 3,911,637 | A * | 10/1975 | Schmidiger | ......... | E04F 19/0468 |
| | | | | | 439/209 |
| 4,037,900 | A * | 7/1977 | Schmidger | ........... | H01R 25/162 |
| | | | | | 174/504 |
| 4,067,529 | A * | 1/1978 | Milcoy | ................. | H02B 1/052 |
| | | | | | 248/214 |
| 4,629,826 | A * | 12/1986 | Thomas | ............... | H02G 3/0431 |
| | | | | | 138/108 |
| 4,871,288 | A * | 10/1989 | Schmidt | ................ | B07B 1/4645 |
| | | | | | 209/399 |
| 4,874,322 | A * | 10/1989 | Dola | .................... | H02G 3/0431 |
| | | | | | 174/502 |
| 5,013,873 | A * | 5/1991 | Deibele | ................ | H02G 3/0431 |
| | | | | | 138/157 |
| 5,199,836 | A * | 4/1993 | Gogarty | ................ | F16B 37/045 |
| | | | | | 411/104 |
| 5,271,585 | A * | 12/1993 | Zetena, Jr. | ........... | G02B 6/4459 |
| | | | | | 174/95 |
| 5,569,884 | A * | 10/1996 | Decore | ................ | H02G 3/0418 |
| | | | | | 138/155 |
| 5,756,933 | A * | 5/1998 | Pitchford | ................ | E04F 17/08 |
| | | | | | 174/481 |
| 5,937,131 | A * | 8/1999 | Haataja | ................ | G02B 6/4459 |
| | | | | | 385/134 |
| 5,939,670 | A * | 8/1999 | Shteynberg | .......... | H02G 3/0487 |
| | | | | | 174/481 |
| 5,957,414 | A * | 9/1999 | Perrignon de Troyes | ................... | |
| | | | | | H02G 3/128 |
| | | | | | 174/101 |
| 6,059,242 | A * | 5/2000 | Lefevre | ..................... | F16B 2/10 |
| | | | | | 138/106 |
| 6,084,180 | A * | 7/2000 | DeBartolo, Jr. | ...... | H02G 3/0431 |
| | | | | | 174/101 |
| 6,191,363 | B1 * | 2/2001 | Samuels | .............. | H02G 3/0425 |
| | | | | | 174/68.3 |
| 6,348,660 | B1 * | 2/2002 | Gutgsell | ............... | H02G 3/0437 |
| | | | | | 174/101 |
| 6,437,243 | B1 * | 8/2002 | VanderVelde | ........ | H02G 3/0418 |
| | | | | | 174/101 |
| 6,521,835 | B1 * | 2/2003 | Walsh | .................. | H02G 3/0437 |
| | | | | | 174/68.3 |
| 6,796,409 | B2 | 9/2004 | Hermey et al. | | |
| 7,034,221 | B2 * | 4/2006 | Johnston | .............. | H02G 3/0431 |
| | | | | | 174/68.3 |
| 7,060,893 | B1 * | 6/2006 | Villi | ..................... | H02G 3/0418 |
| | | | | | 174/507 |
| 7,183,502 | B1 * | 2/2007 | Johnston | .............. | H02G 3/0431 |
| | | | | | 174/480 |
| 7,304,240 | B1 * | 12/2007 | Gretz | ................... | H02G 3/0608 |
| | | | | | 138/107 |
| 7,770,934 | B2 * | 8/2010 | Bally | ........................ | F16L 3/24 |
| | | | | | 248/56 |
| 7,780,129 | B1 * | 8/2010 | Cundy | ................. | A47B 96/067 |
| | | | | | 248/231.91 |
| 7,789,359 | B2 * | 9/2010 | Chopp, Jr. | .............. | H02G 3/263 |
| | | | | | 182/129 |
| 8,267,363 | B2 * | 9/2012 | Begic | .................... | A47B 96/067 |
| | | | | | 211/4 |
| 8,511,627 | B2 * | 8/2013 | Lutze | ....................... | H02B 1/32 |
| | | | | | 211/70.6 |
| 8,746,472 | B2 * | 6/2014 | Thrush | ................... | F16M 13/02 |
| | | | | | 211/94.01 |
| 8,756,772 | B2 * | 6/2014 | Padmore | ............... | H02G 3/0418 |
| | | | | | 174/101 |
| 2005/0247653 | A1 * | 11/2005 | Brooks | ................. | A47F 5/0846 |
| | | | | | 211/94.01 |
| 2005/0285001 | A1 * | 12/2005 | Timmerman | ........ | A47B 96/067 |
| | | | | | 248/312.1 |
| 2007/0114339 | A1 * | 5/2007 | Winchester | ............. | F16L 3/223 |
| | | | | | 248/68.1 |
| 2009/0050345 | A1 * | 2/2009 | Delfosse | ............... | H02B 1/205 |
| | | | | | 174/97 |

FOREIGN PATENT DOCUMENTS

| | | |
|---|---|---|
| FR | 2682230 A1 | 4/1993 |
| FR | 2840462 A1 | 12/2003 |
| WO | 0063584 A1 | 10/2000 |
| WO | 2004/090376 A1 | 10/2004 |

OTHER PUBLICATIONS

PCT International Preliminary Report on Patentability/English Translation of Written Opinion dated Nov. 5, 2013, received in corresponding PCT Application No. PCT/EP12/58075, 6 pgs.

* cited by examiner

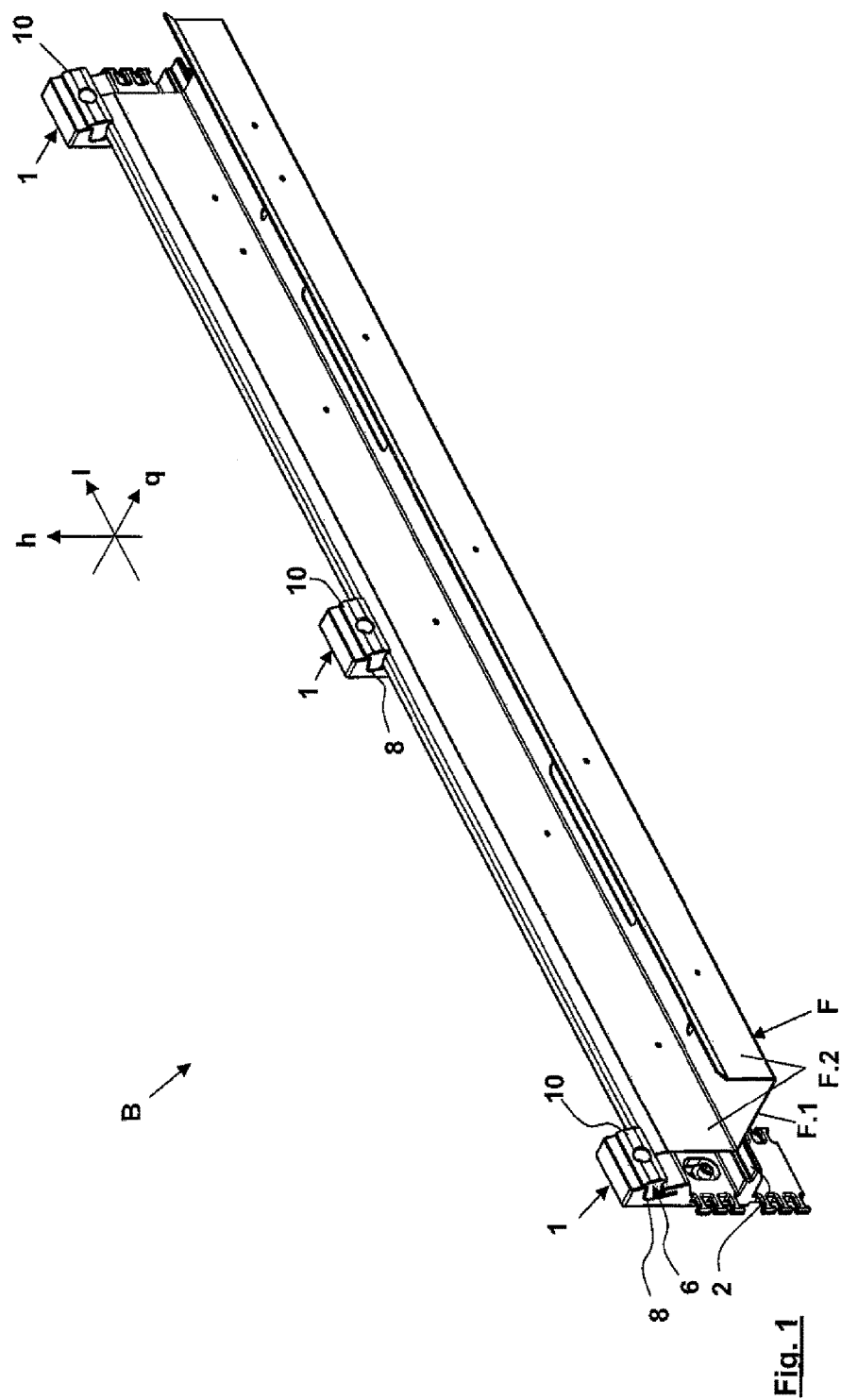

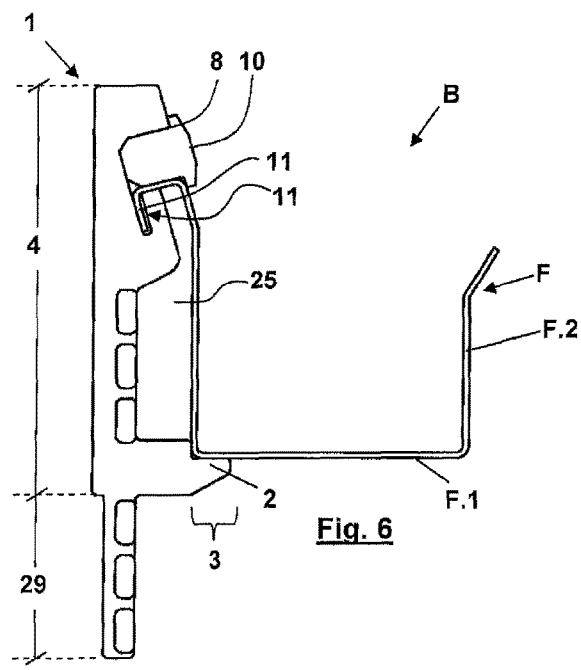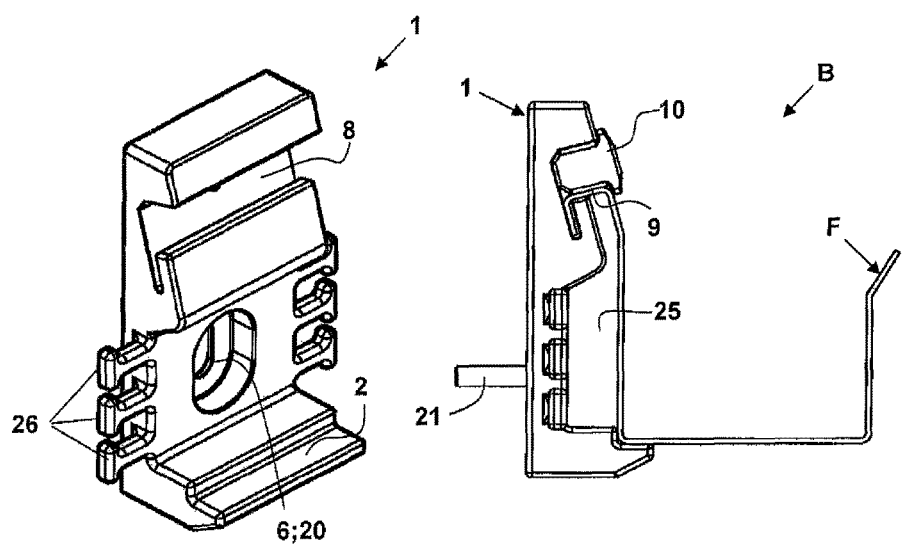

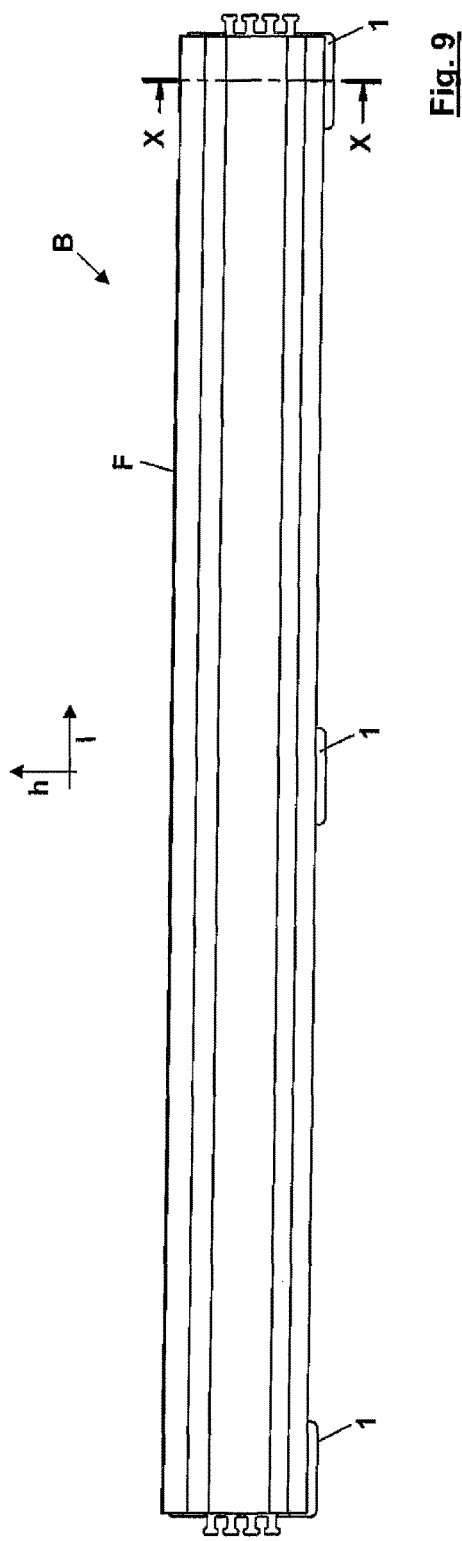
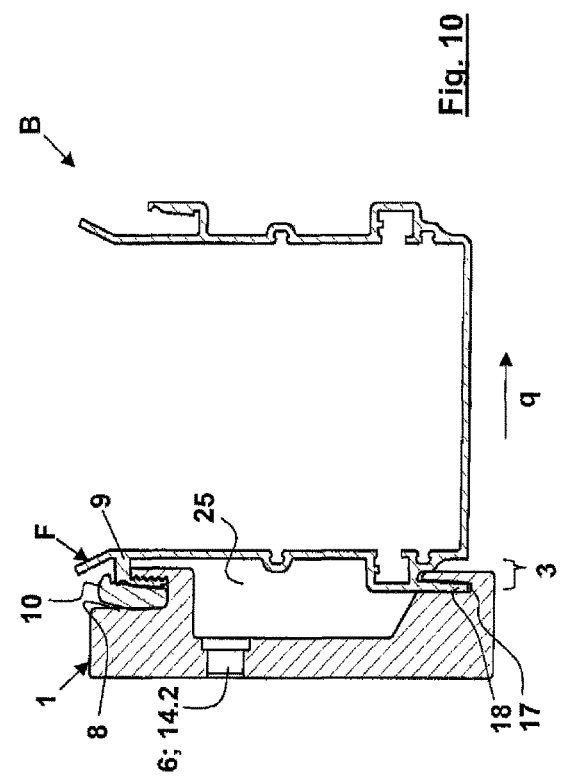

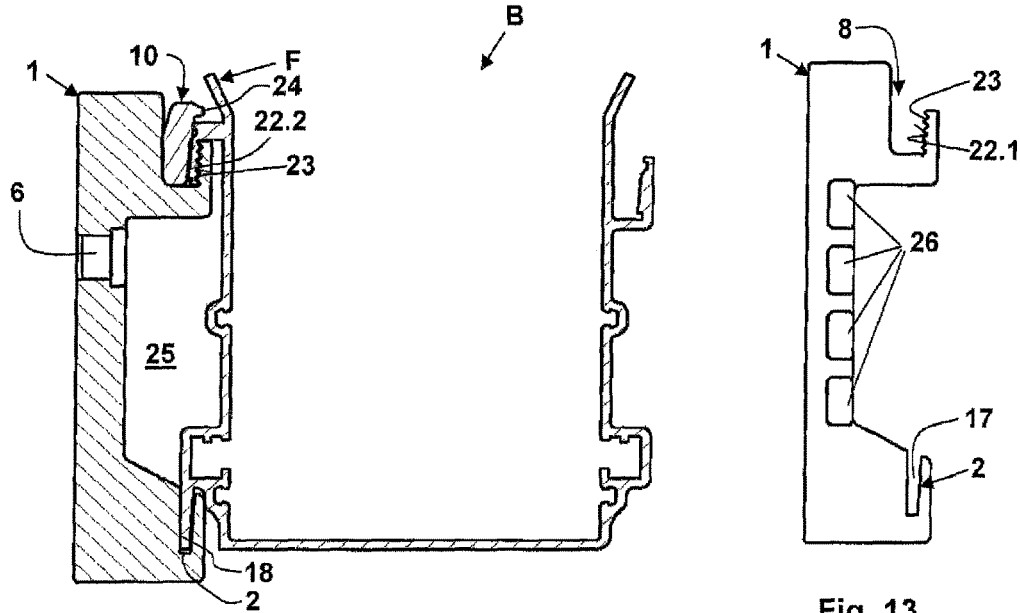
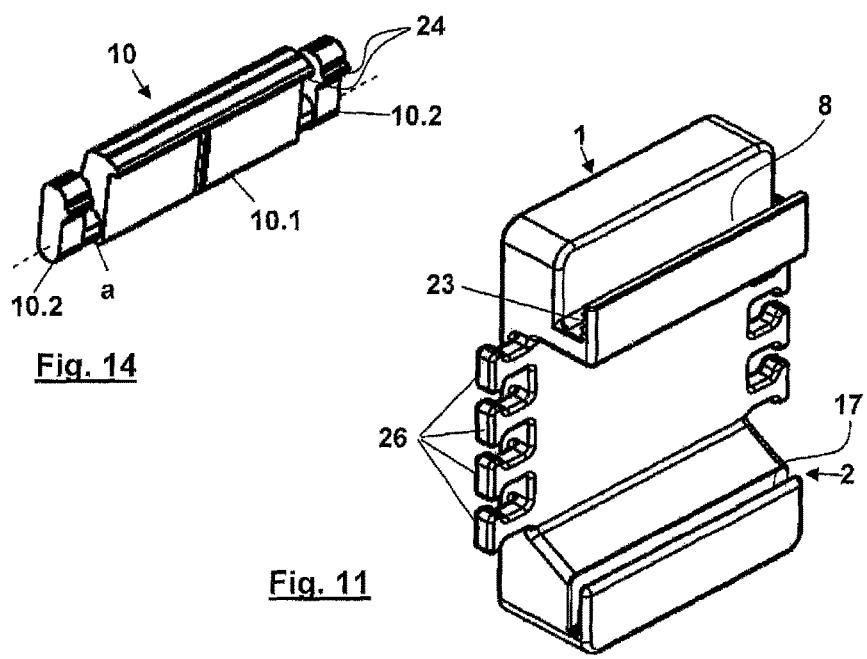

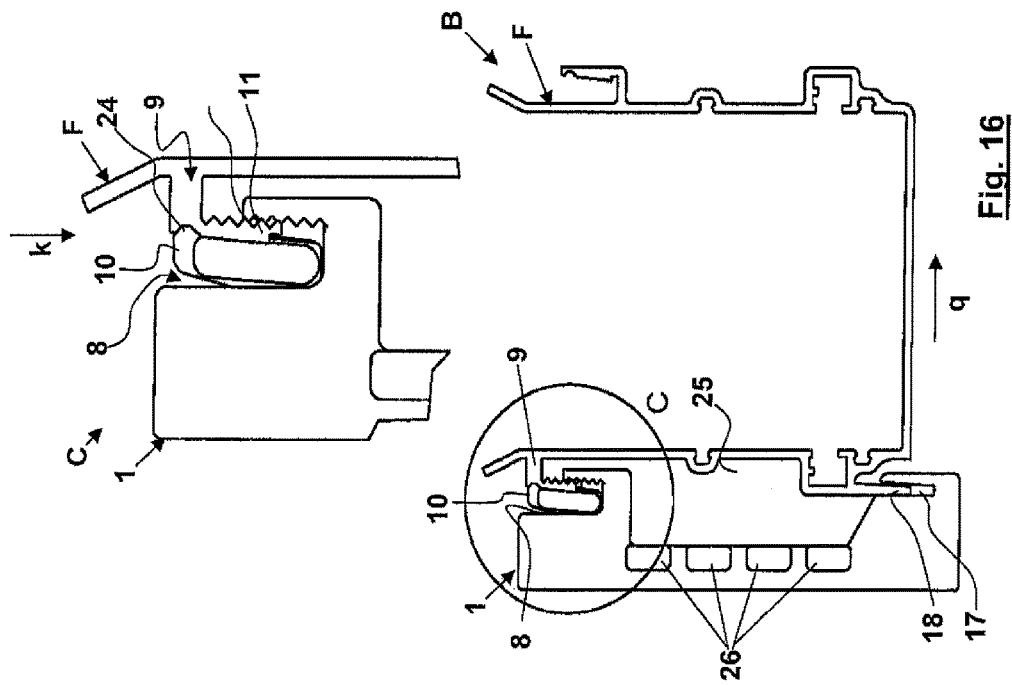
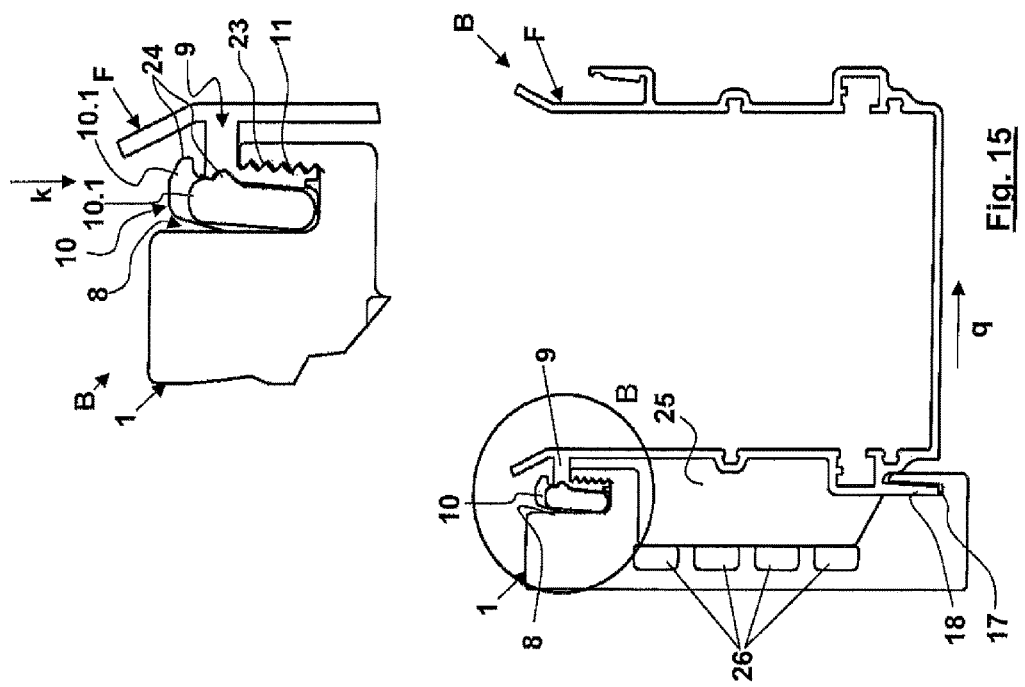

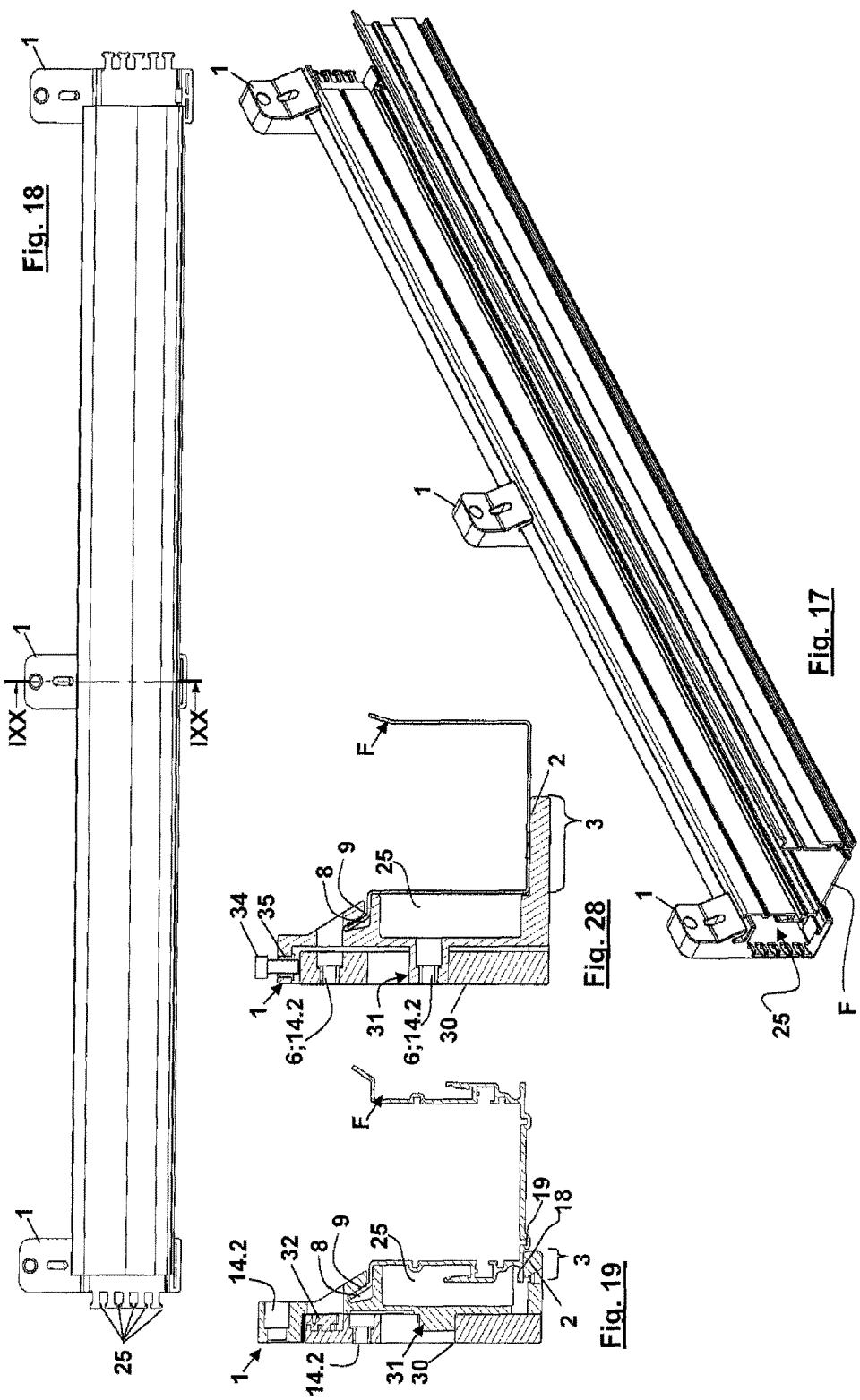

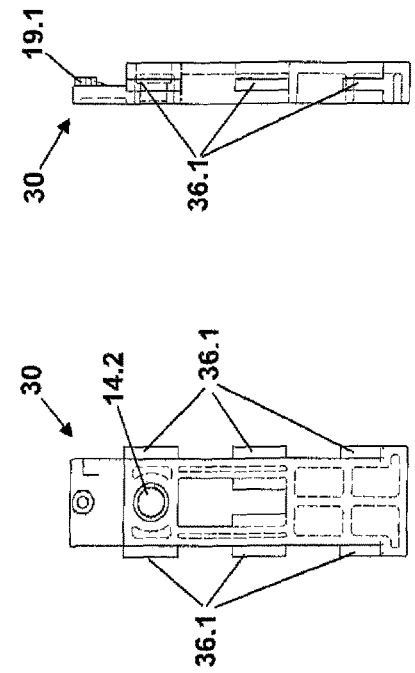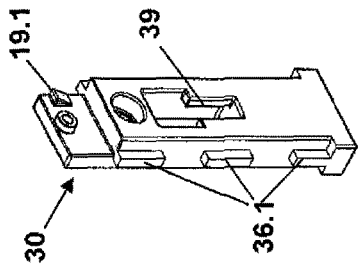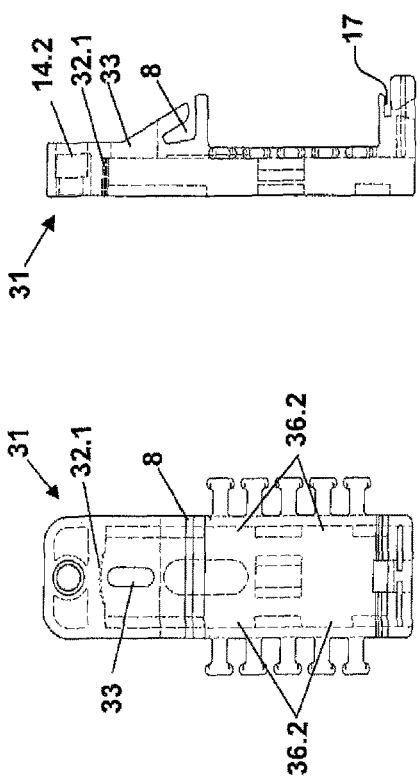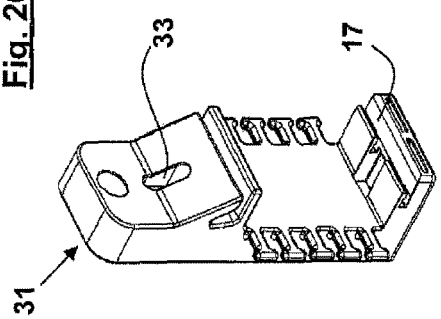

RETAINER FOR LATERALLY FASTENING A GUIDE GROOVE FOR ENERGY SUPPLY CHAINS AND RETAINING SYSTEM HAVING SAID RETAINER

The invention relates to a retainer for laterally fastening a guide channel for cable carrier chains on a structure, wherein the retainer has a support for a floor region of the guide channel and a location fixation for the guide channel and also the retainer extends with a vertical section laterally of a provided receptacle space for the guide channel, in which first fastening means for fastening the retainer at the height of the vertical section are provided laterally on the structure. Furthermore, the invention relates to a retainer system having the retainer and the guide channel.

Such a retainer is designed to be attached laterally on a structure, for example, on a crane having a trolley, which is guided on a girder and is connected to supply lines. In this case, to protect the cable carrier chain, it can be provided that the guide channel, in the case of a girder designed as a double-T girder having terminal transverse webs, is to be attached in a compartment of the double-T girder delimited by the cross members. For this purpose, a row of retainers, which are spaced apart from one another in the longitudinal direction of the girder or the guide channel, respectively, can be preinstalled, these retainers typically being designed as brackets for securely accommodating the guide channel, which can support and retain the guide channel over its entire transverse extension. Subsequently, the guide channels can be laid in the retainer and screwed thereon for location fixation, for which corresponding screw holes must be provided on the guide channels. This is complex and susceptible to malfunction in operation.

The object of the invention is to provide a retainer according to the species, by means of which the guide channel is more easily installable and can be retained securely in operation.

The stated object is achieved according to the invention by the features of claim 1. Advantageous refinements are described in the dependent claims. The stated object is already achieved in that the retainer has two fastening means, which are arranged spaced apart from the support in a vertical direction and are designed to engage in a formfitting and/or friction-locked manner on the guide channel.

Therefore, the second fastening means can engage in a formfitting and/or friction-locked manner on the guide channel, spaced apart in the vertical direction from a floor region of the guide channel. The guide channel can therefore be retained securely and stably at two points or regions which are spaced apart from one another vertically, without fastening openings having to be provided for this purpose in the guide channels, for example. Thanks to an external engagement of the second fastening means on the guide rail, the retainer can accordingly be constructed simply.

The second fastening means can be designed such that a clamp connection between retainer and guide channel is producible thereby. Thanks to this provided clamp connection, simple and rapid fixing in location of the guide channel on the retainer can be performed. This location connection can be accomplished very simply corresponding to the structure of a clamp connection. The spatial spacing of the first fastening means from the second fastening means can be designed such that a guide channel provided for the retainer can be arranged clamped between the first fastening means and the second fastening means. The guide channel can preferably be arranged clamped on the retainer with pre-tension between the first and second fastening means.

For this purpose, the second fastening means can be designed as a clamp receptacle for a first projection of the guide channel, which extends from the guide channel, and as a clamp element for clamping the first projection in the clamp receptacle in a clamping location. A reverse arrangement of clamp receptacle on the guide channel and projection on the retainer is also conceivable. The clamp connection can now be formed in a simple connection procedure using insertion of the first projection of the guide channel into the clamp receptacle and plugging of the clamp element into the clamp receptacle to clamp the first projection in the clamp receptacle. This clamp connection is not only simple in design, but rather also allows rapid work during the installation of the retainer in the guide channel. The clamp receptacle can, in particular in the transverse direction of the receptacle space, be accessible toward the receptacle space and therefore also toward the guide channel, in particular formed to be open. To obtain an additional force perpendicularly to the transverse direction and the longitudinal direction of the guide channel with formation of the clamp connection, it can be provided that the clamp receptacle is designed as accessible, in particular open, at least with one component in or opposite to the vertical direction. For example, the guide channel can have a hooked first projection, which is insertable from above into the clamp receptacle, which is accessible from above, and can be retained therein opposite to the vertical direction. The hooked first projection can be arranged on the guide channel angled to the transverse direction thereof. The hook element can be designed as angled toward a plane in which the base of the guide channel is contained and can extend away from the guide channel. The hooked first projection can preferably be angled at least approximately perpendicularly on the end. In this way, the first projection can be securely retained in the clamp receptacle.

The clamp element can extend over the entire longitudinal extension of the clamp receptacle. The clamp element can have an at least partially wedge-shaped cross-section. The clamp element can be designed such that it is insertable in a clamping direction into the clamp receptacle. In this case, it can have a tapering cross-section at the rear in the clamping direction for its simplified insertion into the clamp receptacle and for solid clamping of the first projection in the clamp receptacle. It is provided that the clamp element holds the first projection in the clamp receptacle in a formfitting manner. The clamp element can preferably have a mushroom-like cross-section having a base, which preferably tapers terminally in the clamping direction, and a front transverse web in the clamping direction. The transverse web can be used in this case as a stop during the insertion of the clamping element into the clamp receptacle, wherein the stop can stop externally on the clamp receptacle and/or on the first projection in the clamp receptacle. The first projection can therefore be retained securely in the clamp receptacle.

In a preferred embodiment of the retainer, it is provided that the clamping element can be fixed in location in the clamp receptacle. For this purpose, for example, a screw connection can be provided between clamping element and clamp receptacle. A screw element can be guided through a first through opening, which is introduced into the clamp element, preferably in the clamping direction, and screwed into the clamp receptacle. The first through opening is preferably designed such that the screw head can be countersunk in the first through opening. To screw together the screw element with the clamp receptacle, a pilot borehole can be provided therein, into which the screw element can be screwed while forming an internal thread in the pilot borehole. The retainer can expediently be produced from plastic, preferably as an injection-molded part.

The support can protrude away from the vertical section in delimitation of the receptacle space over a support region in the transverse direction. Therefore, the support of the receptacle space can at least partially delimit the guide channel on the floor side. Because of the additional fastening of the guide channel by means of the second fastening means, vertically spaced apart from the support, it is not necessary for the support to completely delimit the receptacle space for the guide rail on the floor side using the support region. Rather, in a simplification of the retainer, it can be provided that the support region of the support is smaller or much smaller than a provided floor-side extension of the receptacle space in the transverse direction. In this case, the support region can be less than one-half, preferably less than one-third, or ideally less than one-fifth of the floor-side extension of the receptacle space in the transverse direction. Thanks to the fixing in location by means of the second fastening means, the support region can only protrude away from the vertical section in the transverse direction enough that it delimits the receptacle space for the guide channel by a small amount on the floor side.

Alternatively or additionally, the support can be designed as a groove, which is designed as open or accessible in the vertical direction to accommodate a provided second projection of the guide channel. Accordingly, the second projection of the guide channel can extend at least substantially opposite to the vertical direction to engage in the groove of the support. The second projection can be designed as hooked having an angled hook end. It can extend externally away from the guide channel in the transverse direction and can engage in the groove of the support with its angled hook end opposite to the vertical direction. Therefore, the first projection and the second projection of the guide channel can engage in the clamp receptacle or in the groove, respectively, vertically spaced apart from one another. The second projection can latch in the groove, whereby a solid seat of the guide channel on the retainer can be improved further.

Alternatively or additionally, a further embodiment of the retainer can have a clamp receptacle, which is open or accessible opposite to the vertical direction. The spacing apart of the second fastening means and the support can be dimensioned in this case such that, in the installed location, the guide channel is supported on the clamp receptacle in the vertical direction and is supported on the support on the floor side opposite to the vertical direction. In this embodiment of the retainer, the first projection of the guide channel can extend at least substantially in the vertical direction with its preferably angled end to engage in the clamp receptacle, which is open opposite to the vertical direction. Therefore, to mount the guide channel on the retainer, firstly the guide channel can be inserted using its first projection into the clamp receptacle and can be lowered with sinking of the guide channel about a rotational axis in the longitudinal direction using the clamp receptacle as a pivot bearing and can be guided on the floor side against the support such that the guide channel, preferably with slight pre-tension, is clamped in a formfitting manner between the support and the clamp receptacle. To secure the guide channel in the retainer, in the installed location, latching of the guide channel on the retainer can be performed, in particular at the support.

In an advantageous refinement of the retainer, it can be provided that the retainer is designed as vertically adjustable to set its relative location with respect to the structure and/or to the guide channel. Therefore, the retainer can advantageously be set exactly at the vertical location of the guide channel. Accordingly, the retainer can be designed as adjustable in the longitudinal direction to set its relative location with respect to the structure and/or the guide channel. Thus, for example, a plurality of concatenated fastening holes in the vertical and/or longitudinal direction can be provided as the first fastening means to accommodate a further first fastening means, such as a screw element, so that in this way discontinuous vertical setting can be performed. Alternatively, a rail can be provided for the advantageous continuous vertical adjustment, on which the retainer is arranged so it is displaceable and fastenable in the vertical direction and which is fastenable on the structure.

Particularly preferably, since it has a simple design, the retainer can have as the first fastening means an oblong hole, which extends with at least one component in the vertical direction, for accommodating the further first fastening means, such as the screw element. In an alternative or additional measure, it can be provided that the second fastening means has a first contact surface having a tooth profile for contact on a second contact surface, which is provided on the first projection of the guide channel, having a tooth profile adapted to the tooth profile of the first contact surface. The surface normals of the two contact surfaces can preferably extend at least nearly perpendicularly to the vertical direction in the installed location in this case. For the vertical setting, the tooth profiles can be formfitted with one another at the desired relative vertical location and fixed in location relative to one another by means of the clamping element with engagement of the first projection in the clamp receptacle. The first contact surface can be arranged on the interior of the clamp receptacle.

In an alternative preferred embodiment of the retainer, it can have two fastening parts, which are displaceably guided in and opposite to the vertical direction, a first fastening part for fastening the retainer on the structure and a second fastening part for fastening the guide channel on the retainer. These fastening parts can be movable in a stop-limited manner relative to one another between a loose position, in which the fastening parts are detachable from one another, and a retaining position, in which the fastening parts are interlocked. In this case, the exact location of the retaining position can be settable via interacting stops for the vertical setting, for example. For the vertical setting, for example, an eccentric assembly having an eccentric can be provided, wherein the eccentric acts as a stop for the retaining position. Therefore, by means of the eccentric, the stop for the vertical setting can be changed. The eccentric can be designed as a curve disc having a circumferential curve lateral surface, which is mounted eccentrically about a rotational axis on a fastening part perpendicularly to the vertical direction. With its rotation, the eccentric can slide on the other fastening part via its curve lateral surface at a point spaced apart in the vertical direction. The relative spacing of the two fastening parts to one another can be changed via this with respect to the vertical direction. Via the curvature of the curve side and the eccentricity thereof, the change of the spacing over a distance and the maximum spacing can be set. The curve lateral surface preferably has, at least over the section which slides on the other fastening part for the vertical setting, a gear rim section preferably having serrated teeth, which engage in congruent teeth provided on the other fastening part for the vertical setting and fixing in location. Instead of an eccentric, another positioning element, for example, a positioning screw, can also be used for the vertical setting, which, retained and guided in one fastening part, engages in or opposite to the vertical direction against the other fastening part.

To install the retainer having the two fastening parts on a structure, firstly the first fastening part can be fastened on the structure. The second fastening part can then be connected to the first fastening part such that it is preferably mounted displaceably thereon in the vertical direction. Upon reaching a specific relative vertical location in relation to the first fastening part and therefore in relation to the structure, the second fastening part can be fixed in location on the first fastening part and/or on the structure. The two fastening parts can each advantageously simply be connected via a screw connection to the structure. In a preferred embodiment of the retainer, a feedthrough arranged parallel to the receptacle space can be provided for supply lines, which are to be laid fixedly on the structure in the longitudinal direction of the guide channel. For example, in the case of crane construction, the problem frequently arises that in addition to the variable-location supply lines for the trolley, which are to be guided in the cable carrier chain, an array of supply lines to be arranged fixedly on the structure are to be provided, which can have an interfering effect on the proper movement of the cable carrier chain in consideration of the limited space on the girder for the trolley. The provision of a defined passage of the supply lines, which are to be laid fixedly, in the region of the retainer is therefore very advantageous. With the provision of a defined feedthrough for the supply lines, which are to be laid fixedly on the structure, this problem can be effectively remedied. The feedthrough can be delimited laterally by the retainer and the receptacle space in an embodiment of the retainer having a very simple design.

The supply lines to be laid fixedly can be guided through the feedthrough in such a manner that they remain loose with respect to the retainer. It is preferably provided that fastening capabilities for the supply line to be laid fixedly on the structure are provided on the inlet side and/or outlet side of the feedthrough. Projections extending away in the longitudinal direction from the vertical section, on which the supply lines are fastenable by means of wrapping means, such as cable ties or bands, can preferably be provided as fastening capabilities. The projections can have an L-profile or T-profile with base web and terminal transverse web. In this case, the base web can be used as a receptacle for the wrapping means while the terminal transverse web can ensure that the wrapping means cannot be pushed down in the longitudinal direction from the base web.

Alternatively or additionally, the retainer can have a receptacle section, which adjoins the vertical section opposite to the vertical direction, for further fastening capabilities for the supply lines to be laid fixedly on the structure. These fastening capabilities can be designed as described above.

Therefore, a retainer system is proposed having a retainer according to one of the above-described embodiments and a guide channel having a floor and two side walls, which are spaced apart in parallel and connected via the base. The guide channel can be mounted by means of the retainer externally on one of its side walls on a structure. For this purpose, as described above, the guide channel can have externally, on at least one of the two side walls, a first projection to interact with the second fastening means of the retainer and a second projection to interact with the support of the retainer, wherein the two projections are arranged vertically spaced apart from one another. In adaptation to the second fastening means or to the support, the projections can be designed as hooked, wherein their hooked end, depending on the provided interaction with the second fastening means or with the support, respectively, can point with at least one main directional component in the vertical direction.

Figure 4:
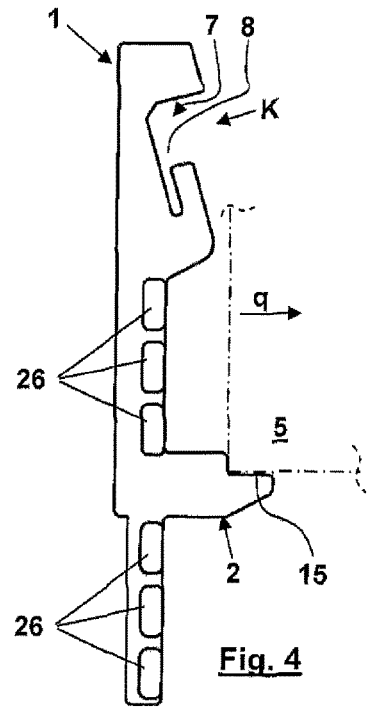
Figure 5:
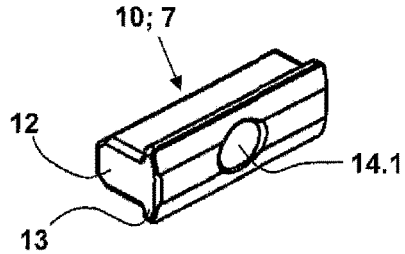
Figure 2:
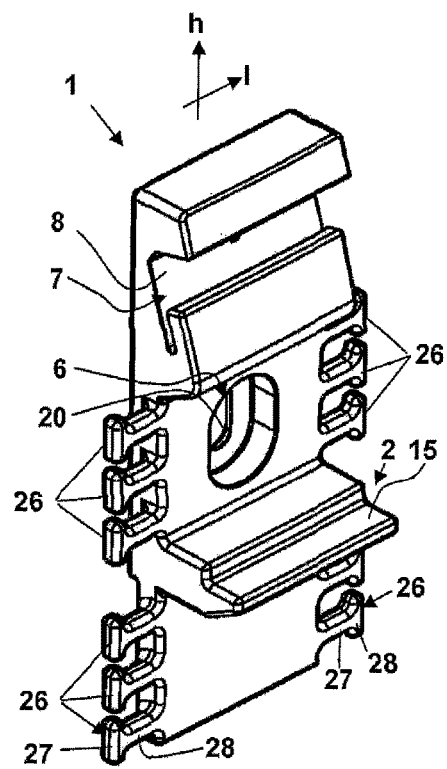
Figure 22:
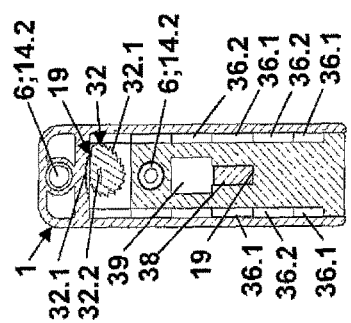
Figure 23:
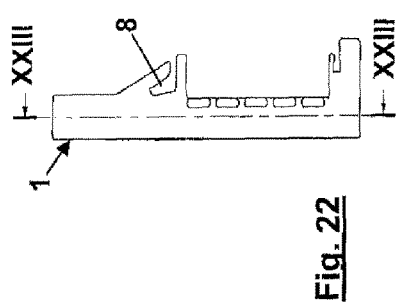
Figure 24:
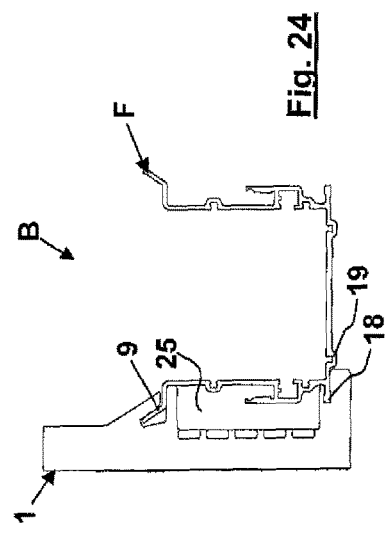
Figure 25:
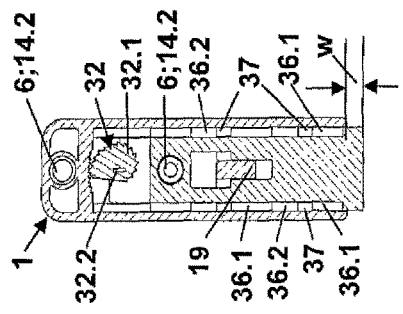
Figure 26:
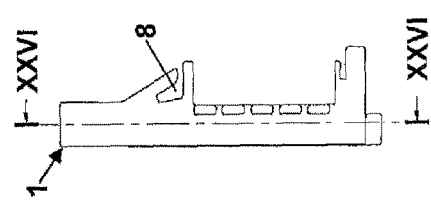
Figure 27:
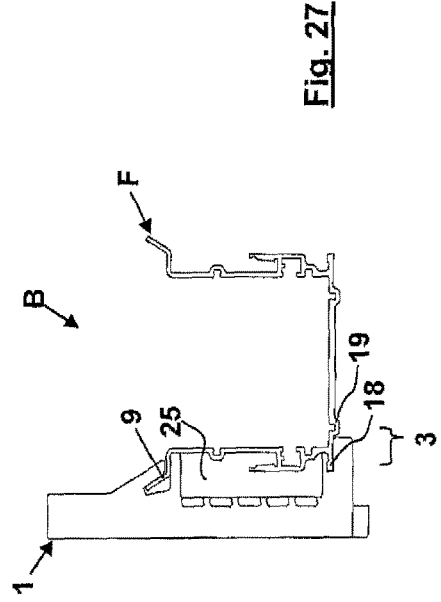

The present invention will be explained in greater detail hereafter on the basis of several embodiments, which are illustrated in a drawing, of the retainer or the retainer system having retainer and guide channel. In the figures:

FIG. 1 shows a perspective embodiment of a first embodiment of a retainer system having a first embodiment of a retainer and a first embodiment of a guide rail, FIGS. 2-4 each show a view of the retainer according to FIG. 1, FIG. 5 shows a perspective view of a clamp element for the retainer system according to FIG. 1, FIG. 6 shows a side view of the retainer system according to FIG. 1, FIG. 7 shows a perspective view of a second embodiment of the retainer for the retainer system according to FIG. 1, FIG. 8 shows a side view of the retainer system according to FIG. 1, but with a retainer according to FIG. 7, FIG. 9 shows a side view of a second embodiment of the retainer system having a second embodiment of the retainer and a second embodiment of the guide channel, FIG. 10 shows a sectional view of the retainer system according to FIG. 9 along section line X-X according to FIG. 9, FIGS. 11-13 each show a view of the second embodiment of the retainer system according to FIG. 9, FIG. 14 shows a perspective top view of a second embodiment of the clamp element, for the retainer system according to FIG. 9 here, FIG. 15 shows a side view of the retainer system according to FIG. 9 and a detailed enlargement B, each in a first vertical position, FIG. 16 shows a side view of the retainer system according to FIG. 9 and a detailed enlargement C, but in a second vertical position, FIG. 17 shows a perspective view of a third embodiment of the retainer system having a third embodiment of the retainer and a third embodiment of the guide rail, FIG. 18 shows a side view of the retainer system according to FIG. 17, FIG. 19 shows a sectional view along section line XIX-XIX according to FIG. 18, FIGS. 20*a-c* each show a view of a first fastening part of the third embodiment of the retainer for the retainer system according to FIG. 17, FIGS. 21*a-c* each show a view of a second fastening part of the third embodiment of the retainer for the retainer system according to FIG. 17, FIG. 22 shows a side view of the third embodiment of the retainer in the first vertical position, FIG. 23 shows a sectional view along section line XXIII-XXIII in FIG. 22 having an eccentric as an adjustable stop for the vertical setting, FIG. 24 shows a side view of the retainer system according to FIG. 17 in the first vertical position, FIG. 25 shows a side view of the third embodiment of the retainer, but in a second vertical position, FIG. 26 shows a sectional view along section line XXVI-XXVI in FIG. 25, FIG. 27 shows a side view of the retainer system, but in the second vertical position, and FIG. 28 shows a sectional view similar to section line XXIII-XXIII, but having a positioning screw as an adjustable stop for the vertical setting.

FIGS. 1 to 28 show various embodiments, views, and partial illustrations of different embodiments of a retainer system B having a guide channel F for cable carrier chains (not shown here) and a retainer 1 for laterally fastening the guide channel F on a structure (not shown here).

The retainer 1 has a support 2 for a floor region 3 of the guide channel F and a location fixation for the guide channel F. The retainer 1 extends with a vertical section 4 laterally to a receptacle space 5 for the guide rail F. This receptacle space 5 is represented, in the figures in which the retainer 1 is shown together with the guide channel F, by the guide rail F per se and is therefore only indicated in FIG. 4 with dashed lines. The guide channel F has a base (F.1) and two side walls (F.2), which are connected via the base (F.1) and are spaced apart in parallel, wherein the guide channel (F) can be mounted on a structure (not shown here) by means of the retainer (1) externally on one of its side walls (F.2).

First fastening means 6 for fastening the retainer 1 at the height of the vertical section 4 laterally on the structure (not shown here) are provided in the vertical section 4. The retainer 1 has two fastening means 7, which are arranged spaced apart from the support 2 away from the support 2 in a vertical direction h. The second fastening means 7 is designed to engage in a formfitting and/or friction-locked manner on the guide channel 5.

By means of the second fastening means 7, a clamp connection of the retainer 1 with the guide channel F can be produced. For this purpose, the two first embodiments of the retainer system B or the retainer 1 according to FIGS. 1 to 16 have a clamp receptacle 8 for a first projection 8 of the guide channel F, which extends laterally from the guide channel F, wherein the projection 8 engages in a formfitting manner in the clamp receptacle. For the friction-locked clamp connection, respectively one clamp element 10 is provided, which is shown in each case in a separate view in FIGS. 5 to 14. The clamp element 10 is designed to clamp the first projection 9 in the clamp receptacle 8, wherein the first projection 9 is arranged in the clamp receptacle 8 in a clamping location. In all embodiments of the retainer system B, the guide channel F is fixed in location laterally by the retainer 1 at two points which are spaced apart vertically. The guide channel F for the retainer system B according to FIGS. 1 to 8 is cut to length from an angled steel profile.

In the first two embodiments of the retainer system B according to FIGS. 1 to 16, the clamp receptacle 8 for accommodating the first projection 9 of the guide channel F is designed as open or accessible in the vertical direction h. The first projection 9 is designed as hooked having an angled hook end 11, using which the first projection 9 engages in the clamp receptacle 8.

The clamp element 10 of the retainer 1 for the retainer system B according to FIGS. 1 to 8 has a mushroom-like cross-section having a base web 12 and a terminal transverse web 13. The clamp element 10 is inserted in a clamping direction k into the clamp receptacle 8 with clamping of the first projection 9. For the fixing in location of the clamp element 10 in the clamping location according to FIGS. 6 and 8, a screw connection (not shown in greater detail here) is provided, wherein a screw element (not shown here) is inserted through a central first through opening 14 of the clamp element 10 and screwed into the retainer 1. The base web 12 is tapered at the rear for easier insertion into the clamp receptacle 8 in the clamping direction k. The transverse web 13 is used, as can be seen clearly in FIGS. 6 and 8, as a stop in the clamping direction k.

The clamp element 10 for the second embodiment of the retainer system B according to FIGS. 9 to 17 has lateral catch lugs 24, using which, as shown in FIGS. 15 and 16, it can latch in various vertical positions on the hook end 11 of the first projection 9 with pre-tension. The clamp element 10 additionally has a middle part 10.1 having lateral wings 10.2 here (FIG. 14), which are connected to one another via an axis a. Therefore, the two wings 10.2 can be tensioned toward one another in a spring-elastic manner in relation to the middle part 10.1 on the axis a. The clamp element 10 can be inserted into the clamp receptacle 8 while it is tensioned in a spring-elastic manner per se and can tension in the clamp receptacle 8 with partial relaxation. The clamp element 8 is therefore arranged in the clamp receptacle 8 while remaining loose, i.e., without solid connection.

The support 2 protrudes with a support region 15 away in front of the vertical section 4 in the transverse direction q in delimitation of the receptacle space 5. In the embodiments shown here of the retainer system B, this support region 15 of the support 2 only extends by a slight amount above the floor region 3 of the guide channel F. In the first embodiment according to FIGS. 1 to 8, the support region 15 is only designed as an L-shaped recess 16, in which the guide channel F is supported laterally in the floor region 3.

In the two embodiments of the retainer system B according to FIGS. 9 to 16 or 17 to 27, respectively, a groove 17, in which the guide channel F engages with a second projection 18, is provided in the support region 15. The second projection 18 extends in the embodiment according to FIGS. 9 to 16 in a hooked shape with its hook end 11 opposite to the vertical direction into the groove 17, which is accordingly open in the vertical direction h, and is supported therein. In contrast, in the embodiment of the retainer system B according to FIGS. 18 to 27, the second projection is latched in the groove 17, wherein the second projection 18 extends away in the transverse direction q from the floor region 3 here and engages to latch in the groove 17, which is open in the transverse direction. In addition, a stop 19 for delimiting the engagement of the second projection 18 in the groove 17 is provided externally on the floor region 3.

Notwithstanding the other embodiments of the retainer system B, in the embodiment according to FIGS. 17 to 27, the clamp receptacle 8 is designed as open opposite to vertical direction h. The first projection 9 also substantially points in the vertical direction h. To fasten the guide channel F on the retainer 1, the first projection 9 is inserted approximately in the transverse direction q into the clamp receptacle 8. Subsequently, the guide channel F is lowered, using the first projection 9 as a rotational axis, into the clamp receptacle 8, wherein the second projection 18, as already noted, is inserted in a latching manner into the groove 17 in the support region 15 of the retainer 1. The guide channel F is therefore fixed in a formfitting manner on the retainer 1.

In all of the embodiments shown here of the retainer system B, guide channel F and retainer 1, as long as no fixing in location of the guide channel F occurs on the retainer 1, are designed differently relative to one another in the longitudinal direction 1. Furthermore, a vertical adjustment can be carried out via the retainer 1, by means of which a more precise vertical setting of the guide channel F with respect to the structure (not shown here) can be performed.

In the embodiment according to FIGS. 1 to 8, only one oblong hole 20 is provided for this purpose, through which a screw element 21 (indicated here in FIG. 8) engages to fasten the retainer 1 on the structure. A vertical adjustment of the retainer over the length of the oblong hole 20 can be performed via a displacement of the retainer 1 on the screw element 21 in the oblong hole 20.

In the embodiments of the retainer system B according to FIGS. 9 to 16, a first contact surface 22.1 or a second contact surface 22.1, each having a tooth profile 23, is provided respectively internally in the clamp receptacle 8 and on the hook end 11 of the first projection 9, wherein the contact surfaces 22.1, 22.2 are arranged approximately perpendicularly to the transverse direction q. For the vertical setting, the contact surfaces 22.1, 22.2 are moved against one another in the desired vertical location with interlocking of their teeth profiles 23 and fixed in location by solid clamping by means of the clamp element 10. The first projection 9 is therefore fixed in location in the clamp receptacle 8. In FIGS. 15 and 16, respectively one vertical position is shown, in FIG. 15 a first vertical position and in FIG. 16 a second vertical position of the guide channel F with respect to the retainer 1. The clamp element 10 has catch lugs 24, by means of which it can latch on the first projection 9 of the guide channel F. For this purpose, the catch lugs engage with elastic spring pre-tension in the transverse direction q in the first projection 9. For fixing the retainer 1 in location on the structure, a countersunk second through opening 14.2 is provided as the first fastening means 6.

For the vertical adjustment on the retainer system B according to FIGS. 18 to 27, the retainer 1 has two fastening parts, which are displaceably guided one inside another in and opposite to the vertical direction h, a first fastening part 30 for fastening the retainer 1 on the structure and a second fastening part 31 for fastening the guide channel F on the retainer 1. The fastening parts 30, 31 are movable in a stop-limited manner relative to one another between a loose position, in which the fastening parts 30, 31 are detachable from one another, and a retaining position, in which the fastening parts are interlocked with one another. The two fastening parts 30, 31 are individually fixable on the structure. For this purpose, both have countersunk second through openings 14.2. For fixing the retainer 1 in location, firstly the first fastening part 30 is fixed in location on the structure. The second fastening part 31 is then plugged opposite to transverse direction q over the first fastening part 30 such that it therefore presses against the second fastening part 31 so it is internally displaceable in the vertical direction h. For the vertical adjustment, interacting stops 19 are provided, wherein an eccentric 32 having an external gear rim 32.1 and a tool opening 32.2 for rotating the eccentric 32 are provided here as a stop 19. The eccentric 32 is arranged so it is rotatable on the first fastening part 30 here and is internally supported with its gear rim 32.1 on top, with formation of the stop 19, on a gear rim 32.1, which is like a circular arc, of the second fastening part 30. With rotation of the eccentric 32, the relative location of the two fastening parts 30, 31 in the vertical direction h over a distance w can be set (FIG. 26), wherein the gear rim 32.1 of eccentric 32 and second fastening part 30 engage in one another in a latching manner. The eccentric 32 can be set by a tool (not shown here), which engages, while passing through an eccentric opening 33 provided in the second fastening part 31, into the tool opening 32.2 of the eccentric 32.

For the displaceable guiding in the vertical direction h, the fastening parts 30, 31 engage in a toothed manner in one another. For this purpose, the second fastening part 31 is open opposite to the transverse direction q. The first fastening part 30 comprises laterally protruding first guide projections 36.1, by means of which the first fastening part 30 is inserted in the transverse direction q through openings 37 provided on the second fastening part 31 (FIG. 23). These openings 37 are delimited in the vertical direction h by inwardly protruding second guide projections 36.2, behind which the first guide projections 36.1 engage with the displacement of the inserted first fastening part 30 in the vertical direction h into the retaining position (FIG. 26). The first fastening part 31 presses from the front in the transverse direction q against the second fastening part 31 in a displaceable manner.

For the further stop delimiting opposite to the vertical direction h, the second fastening part 31 has a stop-active third projection 38 on the interior. This projection engages, with interlocking of the two fastening parts 30, 31, in an opening 39 provided on the first fastening part 30, wherein the third projection 38 stops in the loose position opposite to the vertical direction h on the edge of the opening 37 (FIG. 23). For fixing in location in the vertical direction h, a protruding stop 19.1 is provided on top on the first fastening means 30, which stops internally on the second fastening part 31 at the height of the eccentric 32 when the two fastening parts 30, 31 are plugged one inside the other. With completed vertical setting of the second fastening part 31 on the first fastening part 30, which is already fixed in location on the structure, the second fastening part 31 can in turn be fixed in location on the structure. For this purpose, it also has a second through opening 14.2 as a first fastening means 6.

FIG. 28 shows a sectional view similar to section line XIX-XIX in FIG. 19, wherein a positioning screw 34 is provided for the vertical setting here instead of the eccentric as a settable stop, wherein the positioning screw 34, in a screw socket 35, retained and guided in the second fastening part 30, engages opposite to the vertical direction h against the first fastening part 31. Furthermore, the support 2 extends here over approximately half of the floor region 3 of the guide channel F.

In the embodiments shown, the retainer system B additionally has a feedthrough 25 for supply lines (not shown here), which are to be laid fixedly in the longitudinal direction 1 of the guide channel F. The feedthrough 25 is laterally delimited by the retainer 1 and the receptacle space 5 or they guide channel F. Projections 26, which extend in the longitudinal direction 1, are provided on the inlet side and outlet side of the feedthrough 25, on which projections the supply lines to be laid fixedly on the structure are fastenable by means of wrapping means (not shown here). The projections 26 have a T-profile having base web 26 and terminal transverse web 27. For example, cable ties can be used as wrapping means, which can be drawn tight jointly around the supply lines (not shown here) to be laid and the base web 26, wherein the terminal transverse web 27 prevents slipping down of these wrapping means.

LIST OF REFERENCE SIGNS 1 retainer
2 support
3 floor region
4 vertical section
5 receptacle space
6 first fastening means
7 second fastening means
8 clamp receptacle
9 first projection
10 clamping element
10.1 middle part
10.2 wing
11 hook end
12 base web
13 transverse web
14.1 first through opening 14.2 second through opening
15 support region
16 recess
17 groove
18 second projection
19 stop
20 oblong hole
21 screw element
22.1 first contact surface
22.2 second contact surface
23 tooth profile
24 catch lug
25 feedthrough
26 projection
27 base web
28 transverse web
29 receptacle section
30 first fastening part
31 second fastening part
32 eccentric
32.1 gear rim
32.2 tool opening
33 eccentric opening
34 positioning screw
35 screw socket
36.1 first guide projection
36.2 second guide projection
37 opening
38 third projection
39 opening
B retainer system
F guide channel
F.1 base
F.2 side wall
a axis
h vertical direction
k clamping direction
l longitudinal direction
q transverse direction
w distance

What is claimed is:

1. A retainer system to retain at least one cable carrier chain and/or at least one supply line on a structure, comprising:
   a guide channel having a floor region,
   a retainer, wherein the retainer has a support which is configured to support the floor region of the guide channel,
   wherein the retainer extends with a section laterally of a receptacle space for the guide channel, the section including a first fastener for fastening the retainer laterally on the structure,
   wherein the retainer has a second fastener spaced from the support,
   wherein the guide channel includes a laterally extending first projection, and the second fastener includes a clamp receptacle configured to accommodate the laterally extending first projection of the guide channel, and a clamp element insertable into the clamp receptacle,
   wherein the laterally extending first projection has a shape of a hook having a first region followed by a second region angled relative to the first region and forming a hook end, and
   wherein the clamp receptacle is configured to accommodate the laterally extending first projection with the shape of the hook having the first region followed by the second region angled relative to the first region and forming the hook end.

2. The retainer system according to claim 1, wherein, when the guide channel and retainer are assembled, the guide channel is supported laterally by the support.

3. The retainer system according to claim 1, wherein the section of the retainer extends in a vertical direction as a vertical section, the support of the retainer protrudes away from the vertical section of the retainer in a transverse direction, and the transverse direction is transverse to the vertical direction.

4. The retainer system according to claim 3, wherein the support of the retainer protrudes away from the vertical section of the retainer in the transverse direction with the support in delimitation of the receptacle space for the guide channel.

5. The retainer system according to claim 1, wherein the guide channel has two side walls, and the two side walls of the guide channel are spaced apart in parallel, and the guide channel is mountable to the retainer by one of the two side walls.

6. The retainer system according to claim 1, wherein the second fastener is configured to engage with the guide channel.

7. The retainer system according to claim 6, wherein the second fastener is configured to engage with the guide channel in a formfitting and/or a friction-locked manner.

8. The retainer system according to claim 1, wherein the clamp element is fixable in the clamp receptacle.

9. The retainer system according to claim 1, wherein, when the retainer, guide channel and clamp element are assembled, the laterally extending first projection of the guide channel is retained in the clamp receptacle by the clamp element.

10. The retainer system according to claim 1, wherein, when the retainer, guide channel and clamp element are assembled, the laterally extending first projection of the guide channel is clamped between the clamp element and the retainer.

11. The retainer system according to claim 1, wherein, when the retainer, guide channel and clamp element are assembled, the laterally extending first projection of the guide channel is arranged beneath the clamp element.

12. The retainer system according to claim 1, wherein, when the retainer, guide channel and clamp element are assembled, the first region of the shape of the hook extends along an underside of the clamp element, and the second region of the shape of the hook angled relative to the first region and forming the hook end is located in a groove of the clamp receptacle.

13. The retainer system according to claim 1, wherein the clamp element has at least one of a substantially rectangular shape comprising flanges on a top surface and a substantially T-shaped cross-section formed by a base web and a terminal transverse web.

14. The retainer system according to claim 1, wherein the retainer is configured to underlie the floor region of the guide channel.

15. The retainer system according to claim 1, wherein the first fastener comprises a through-hole.

16. The retainer system according to claim 1, wherein, when the retainer and guide channel are assembled, a guide is formed between the section of the retainer and the guide channel, the guide configured to receive at least one supply line arranged in a longitudinal direction of the guide channel.

17. The retainer system according to claim 16, wherein the retainer includes a fastening structure to fasten the at least one supply line to the retainer.

18. The retainer system according to claim 17, wherein the fastening structure comprises at least one projection extending in the longitudinal direction of the guide channel.

19. The retainer system according to claim 18, wherein the at least one projection extending in the longitudinal direction of the guide channel has an L-profile or T-profile.

20. The retainer system according to claim 1, wherein the support comprises a first support section and a second support section, the second support section defining a step having a height smaller than a height of the first support section.

21. The retainer system according to claim 1, wherein the retainer is configured to laterally support the floor region of the guide channel.

22. A retainer to retain a guide channel for at least one cable carrier chain and/or at least one supply line on a structure, wherein the guide channel has a floor region and a laterally extending first projection with a shape of a hook having a first region followed by a second region angled relative to the first region and forming a hook end, the retainer comprising:
wherein the retainer has a support which is configured to support the floor region of the guide channel,
wherein the retainer extends with a section laterally of a receptacle space for the guide channel, the section including a first fastener for fastening the retainer laterally on the structure,
wherein the retainer has a second fastener spaced from the support,
wherein the second fastener includes a clamp receptacle configured to accommodate the laterally extending first projection of the guide channel, and a clamp element insertable into the clamp receptacle,
wherein the clamp receptacle has a first receptacle region followed by a second receptacle region angled relative to the first receptacle region,
wherein the first receptacle region accommodates the first region of the laterally extending first projection of the guide channel,
wherein the second receptacle region accommodates the second region of the laterally extending first projection of the guide channel angled relative to the first region and forming the hook end,
wherein the retainer comprises a single piece body which provides the clamp receptacle and the first fastener in a fixed arrangement relative to one another, and
wherein the clamp element is operable upon insertion into the clamp receptacle to clamp the laterally extending first projection of the guide channel with the clamp receptacle.

23. The retainer according to claim 22, wherein the clamp element is fixable in the clamp receptacle.

24. The retainer according to claim 22, wherein the retainer and clamp element are configured to retain the laterally extending first projection of the guide channel in the clamp receptacle.

25. The retainer according to claim 22, wherein the clamp element has at least one of a substantially rectangular shape comprising flanges on a top surface and a substantially T-shaped cross-section formed by a base web and a terminal transverse web.

26. The retainer according to claim 22, wherein the first fastener comprises a through-hole.

27. The retainer according to claim 22, wherein the retainer includes a fastening structure to fasten the at least one supply line to the retainer.

28. The retainer according to claim 27, wherein the fastening structure comprises at least one projection extending in the longitudinal direction of the guide channel.

29. The retainer according to claim 28, wherein the at least one projection extending in the longitudinal direction of the guide channel has an L-profile or T-profile.

30. The retainer according to claim 22 wherein the section of the retainer extends in a vertical direction as a vertical section, the support of the retainer protrudes away from the vertical section of the retainer in a transverse direction, and the transverse direction is transverse to the vertical direction.

31. The retainer according to claim 22 wherein the support comprises a first support section and a second support section, the second support section defining a step having a height smaller than a height of the first support section.

32. The retainer according to claim 22 wherein the retainer is configured to laterally support the floor region of the guide channel.

33. A retainer to laterally retain a guide channel for at least one cable carrier chain and/or at least one supply line on a structure, the retainer comprising:
a support configured to support a floor region of the guide channel, and
a location fixation for the guide channel,
wherein the retainer is configured to extend with a section laterally of a receptacle space for the guide channel, the section including a first fastener for fastening the retainer laterally on the structure,
wherein the retainer has a second fastener spaced from the support and configured to engage in a form fitting and/or friction-locked manner with a laterally extending first projection of the guide channel,
wherein a clamp connection with the guide channel is producible by the second fastener, wherein the second fastener includes a clamp receptacle configured to accommodate the laterally extending first projection of the guide channel and a clamp element insertable into the clamp receptacle,
wherein the retainer comprises a single piece body which provides the clamp receptacle and the first fastener in a fixed arrangement relative to one another, and
wherein the clamp element is operable upon insertion into the clamp receptacle to clamp the laterally extending first projection of the guide channel with the clamp receptacle.

* * * * *